United States Patent Office 3,062,720
Patented Nov. 6, 1962

3,062,720
SUSTAINED RELEASE PHARMACEUTICAL TABLET
Christopher H. Costello, Columbus, Ohio, assignor, by mesne assignments, to Philips Roxane, Inc., a corporation of Delaware
No Drawing. Filed May 20, 1959, Ser. No. 814,398
11 Claims. (Cl. 167—82)

The present invention relates to a sustained release pharmaceutical tablet. More particularly the present invention relates to a tablet of this character which substantially retains its original shape and form as it passes through the stomach and intestines while still permitting the gradual uniform release of soluble medicaments.

Various types of sustained release tablets have heretofore been proposed. In general, however, these tablets have involved the use of several enteric coatings separated by a medicament or the use of discrete granules having different release rates. In general tablets of these types have not given a uniform prolonged release of medicaments. In some instances the release rate has been relatively rapid for part of the time period involved and in other cases the release rate has been altogether too slow.

In accordance with the present invention the surprising discovery has been made that a relatively homogeneous tablet may be provided containing a substantially water insoluble fatty material or time delay material, together with fillers, binders and lubricants and water soluble medicaments. Such a tablet will have a uniform sustained release action of from 8 to 12 hours providing the ingredients and their solubility are proportioned in a manner to be hereinafter specifically set forth.

In general the sustained release tablet of the present invention must have a minimum of about 10% of water insoluble fatty material as hereinafter defined. It should preferably contain from 10 to 40% of such material and from 1 to 70% of the water soluble medicament, together with fillers, binders and lubricants. Further, the sustained release tablet of the present invention preferably has a hardness of between 3 kg. and 10 kg. when tested on the well known Monsanto tablet hardness tester.

It has been found in accordance with the present invention that all of the ingredients must have a definite solubility factor and that when the solubility factor of each ingredient is multiplied by the weight percent of such ingredient and the totals then added the resultant number, which is hereinafter termed the time delay number, is between approximately 250 and 350. In general if the composition from which the tablets are made have a time delay number of 250, then they should be correspondingly in the higher range of hardness, i.e. at about 10 kg., and if the time delay number is at the upper end of the range, i.e., at about 350, then the tablets should have a hardness at the lower end of the hardness range, i.e., at about 3 kg. In calculating the solubility factor the ingredients are classified in accordance with the following: components ordinarily considered to be very soluble, whereof one gram is soluble in less than 1 to 10 ml. of water are given a solubility factor of 1. Components ordinarily considered soluble having a solubility of 1 gram in 10 to 100 ml. of water are given a solubility factor of 2. Slightly soluble components having a solubility of 1 gram in 100 to 1,000 ml. of water are classified as 3. Very slightly soluble components whereof one gram is soluble in 1,000 to 10,000 ml. of water are classified as 4, and practically insoluble components which require more than 10,000 ml. of water to dissolve one gram are classified as 5.

This classification above set forth is based on solubility in water since the release pattern of the medicament from the tablets of the present invention is not dependent on pH or enzyme activity as will be hereinafter set forth.

In general in preparing the tablets the medicament, the insoluble fatty material or delay release material, the fillers and binders are mixed in powdered form and moistened, preferably with the use of a mixture of aqueous and organic solvent. An especially desirable moistening material is a one to one water-alcohol solution. The moistened mass which should be just coherent is forced through a fine screen such as a No. 14 and dried on trays at room temperature, or in some instances at slightly above room temperature. After drying the granules are again sifted and at this point mixed with the lubricant. They are thereafter conventionally compressed into tablets of the hardness previously indicated.

MEDICAMENT

The medicament forming a part of the tablet of the present invention is present in an amount of from 1 to 70% by weight. Any very soluble or soluble medicament falling within the classification of 1 or 2 previously indicated may be used as part of the tablet. Examples of such medicaments include aminophylline, soluble salts, such as potassium iodide, ammonium chloride, ferrous gluconate, ephedrine compounds, cerebral stimulants, such as d-amphetamine sulfate, antihistamines, such as pyrilamine maleate, respiratory and circulatory stimulants, such as a mixture of pentylenetetrazol and nicotinic acid, sedatives or hypnotics, such as pentobarbital sodium, antispasmodics such as hyoscyamine sulfate or atropine sulfate. Also included are soluble antibiotics, such as soluble forms of penicillin or salts of other antibiotics.

INSOLUBLE SOLID FATTY MATERIALS OR DELAY RELEASE MATERIALS

Such materials must be present in the tablet in an amount approximately equal to 10 to 40% by weight thereof. Some of these materials when added to the granulation are also classified as lubricants. The materials include fatty acids of from 12 to 22 carbon atoms, i.e. fatty acids having a low solubility and classified 4 or 5, such as stearic or palmitic acids, long chain fatty alcohols, i.e. of 14 to 31 carbon atoms, such as stearyl or cetyl alcohol, hydrogenated oils, such as hydrogenated cottonseed oil, waxes, i.e. esters of fatty acids having from 12 to 31 carbon atoms with a fatty alcohol having from 12 to 31 carbon atoms such as powdered carnauba wax, beeswax, etc., alkaline earth salts of long chain fatty acids, such as magnesium or calcium stearates, other mono, di or triglyceryl esters of long chain fatty acids, such as glyceryl monostearate. It may be noted that where the alkaline earth salts of long chain fatty acids are included within the 10% minimum, they cannot constitute more than about 5% thereof, the balance being one of the other fatty materials of the character above set forth. As previously set forth the delay release material can be incorporated into the granulation or added to the granulation along with the lubricants. It is the delay release materials, together with the other insoluble materials which enable the tablet to retain its original shape while the soluble materials and medicaments are gradually leached away to form a network of minute channels through the tablet. Especially desirable delay release materials are stearic acid and a highly hydrogenated cottonseed oil known as "Sterotex."

FILLER

As a filler material there may be used any of the well known filler materials commonly used in tablet formulations. The filler, however, must be selected so as to give the final composition the proper time delay number within the range of 250 to 350. There may, therefore, be used as fillers, water soluble materials such as sucrose or mannitol, more insoluble materials such as calcium phosphate dibasic or magnesium carbonate, and insoluble fillers such as talc or magnesium trisilicate. Other fillers which may be used are glucose, lactose, ether derivatives of starch which are resistant to swelling in water and starch esters containing hydrophobic groups which are difficult to wet. In general no large proportion of starch capable of swelling should be used since this would tend to break the tablet and promote undesired solubility.

BINDERS

The binders which form part of the granulation may be the usual water soluble types, such as acacia or gelatin, and may also include alcohol soluble and water insoluble binders such as zein. Other binders well known in the art may be used, such as tragacanth, shellac, methyl cellulose, ethyl cellulose, guar gum, sodium carboxymethyl cellulose, etc.

LUBRICANTS

Lubricants include most of the materials previously set forth as fatty materials. The difference is that these materials are added to the granulation when used as lubricants so as to prevent the granulation from sticking to the tablet punches. Suitable lubricants also include talc and magnesium stearate. In general the desirable lubricant is insoluble or only slightly soluble in water so as to increase the time delay number.

In general, therefore, it may be stated that the composition of the tablet includes, by weight, 1 to 70 percent of medicament, 10 to 40 percent of delay release material or insoluble fatty material, 5 to 70 percent of filler, 5 to 10 percent of binders and from 5 to 20 percent of lubricant. There may also be included in the tablet a buffering agent or acid neutralizing agent capable of modifying the initial release rate of active ingredients. Thus where the active ingredient is an alkali metal salt which may be converted by the hydrochloric acid in the gastric fluid to the less soluble base, the tablet may preferably include an acid neutralizer compound or buffering compound such as magnesium hydroxide or aluminum hydroxide. This will form part of the tablet filler. If, on the other hand, the solubility of the medicament in alkaline medium is low, the tablet may contain an acid buffering material such as sodium acid phosphate, sodium citrate-citric acid buffer, calcium phosphate monobasic, etc.

The following specific examples serve to illustrate but are not intended to limit the present invention.

Example I

There was thoroughly mixed as dry powder 4.8 parts by wt. of d-amphentamine sulfate (medicament), 24.7 parts by wt. of calcium phosphate, dibasic (filler), 26 parts by wt. of hydrogenated cottonseed oil (water insoluble fatty material), 26 parts by wt. of powdered sucrose (filler), 5.2 parts by wt. of acacia (binder), and 5.2 parts by wt. of zein (binder). Ethyl alcohol and water in equal parts were added to the dry powders with mixing until the mass was uniformly moistened to an extent sufficient to cohere when compressed in the palm of the hand. The moistened mass was then forced through a No. 14 mesh screen and dried on trays at 60° C. for 20 minutes followed by drying at room temperature. After drying the granules are again sieved through a No. 14 mesh screen, mixed with 4.6 parts by wt. of talc (lubricant) and 4.2 parts by weight of magnesium stearate (lubricant) and compressed into tablets having a hardness on a Monsanto Tablet Hardness tester (U.S. Patent No. 2,041,689) of 5.0 kg. The tablets were of a size to contain approximately 15 mg. of d-amphetamine sulfate.

The above composition had a time delay number of 331. This was calculated as follows:

| Material | Percent | Solubility factor | Total |
| --- | --- | --- | --- |
| d-Amphetamine sulfate | 4.8 × | 1 | 4.8 |
| Calcium phosphate, dibasic | 24.0 × | 4 | 96.0 |
| Hydrogenated cottonseed oil | 26.0 × | 5 | 130.0 |
| Sucrose | 26.0 × | 1 | 26.0 |
| Acacia | 5.2 × | 1 | 5.2 |
| Zein | 5.2 × | 5 | 26.0 |
| Talc | 4.6 × | 5 | 23.0 |
| Magnesium stearate | 4.2 × | 5 | 21.0 |
| Time delay number | | | 331.0 |

When the above tablets were given a standard solubility test i.e. exposure to artificial gastric fluid for one hour followed by exposure to artificial intestinal fluid for seven hours in a U.S.P. disintegration test apparatus at a temperature of 37° C., the d-amphetamine sulfate released was 38% at the end of one hour, 68% at the end of 4 hours and 88% at the end of 8 hours. At the end of one hour the tablet lost 18% of its weight, at the end of 4 hours 30% of its weight and at the end of 8 hours 38%. The same results were obtained upon an 8 hour test in gastric juice alone. In water the release of amphetamine was 33% at one hour, 62% at 4 hours and 80% at 8 hours.

Example II

The tablets of Example I were made up exactly as described except that 26% of carnauba wax was substituted for the hydrogenated cottonseed oil. These tablets had the same time delay number and upon test, as described in Example I, the amphetamine release was 46% at the end of one hour, 79% at the end of four hours and 95% at the end of eight hours. The tablets lost 20% of their weight in one hour, 41% in four hours and 79% in eight hours. Although the weight loss was somewhat higher than in Example I, the tablets nevertheless retained their form.

In the same way the substitution of 26% of stearyl alcohol gave 41% release at the end of one hour, 77% at the end of four hours, and approximately 100% at the end of eight hours. Tablet weight loss one hour 20%, four hours 42%, eight hours 79%. Substitution of palmitic acid gave a release of 38% at the end of one hour, 68% at the end of four hours, 97% at the end of eight hours. Weight loss in this instance 18% at the end of one hour, 45% at the end of four hours and 90% at the end of eight hours. Substitution of tri stearin gave a release of 47% at the end of one hour, 80% at the end of four hours and 97% at the end of eight hours, the loss of weight was 22%, 37% and 45% respectively.

Example III

The procedure of Example I was repeated except the 26% of hydrogenated cottonseed oil was replaced by 26.6% of stearic acid (solubility factor 4) and the 4.6% of talc by 4% of talc. The same procedure was followed using 10.8% stearic acid and 19.9% of talc.

The following results were obtained:

| Stearic acid, percent | Release of amphetamine | | |
| --- | --- | --- | --- |
| | 1 hour, percent | 4 hours, percent | 8 hours, percent |
| 26.6 | 35 | 65 | 92 |
| 10.8 | 47 | 77 | 93 |

Example IV

A d-amphetamine sulfate tablet was made up in the same manner as Example I except that the following ingredients and proportions were used:

| Materials | Percent by weight | Solubility factor | Total |
|---|---|---|---|
| Medicament: d-Amphetamine sulfate | 5.7 × | 1 | 5.7 |
| Fillers: | | | |
| Calcium phosphate, dibasic | 6.2 × | 4 | 24.8 |
| Powdered sugar | 32.5 × | 1 | 32.5 |
| Glucose | 32.5 × | 1 | 32.5 |
| Binders: | | | |
| Zein | 3.6 × | 5 | 18.0 |
| Acacia | 2.1 × | 1 | 2.1 |
| Fatty material: Stearic acid | 10.4 × | 4 | 41.6 |
| Lubricant: Talc | 7.0 × | 5 | 35.0 |
| Time delay number | | | 192.2 |

These tablets dissolved completely in water or artificial gastric fluid in one hour.

*Example V*

A tablet containing in a weight of 4.8 grains, .3111 mg. of hyoscymine sulfate, .0582 mg. of atropine sulfate, .0195 mg. of hyoscine hydrobromide and 48.6 mg. of pentobarbital sodium was made up in the same manner as Example I from the following ingredients:

| Material | Percent by weight | Solubility factor | Total |
|---|---|---|---|
| Medicament: | | | |
| Hyoscymine sulfate | | | |
| Atropine sulfate | 0.12 × | 1 | 0.12 |
| Hyoscine hydrobromide | | | |
| Pentobarbital sodium | 16.1 × | 1 | 16.1 |
| Fillers: | | | |
| Calcium phosphate, dibasic | 24.7 × | 4 | 98.8 |
| Powdered sugar | 15.48 × | 1 | 15.48 |
| Fatty material: Hydrogenated cottonseed oil | 15.0 × | 5 | 75.0 |
| Binders: | | | |
| Zein | 5.2 × | 5 | 26.0 |
| Acacia | 5.2 × | 1 | 5.2 |
| Lubricants: | | | |
| Magnesium stearate | 3.9 × | 5 | 19.5 |
| Talc | 14.3 × | 5 | 71.5 |
| Time delay number | | | 327.7 |

The tablets produced had a hardness of 3.7 kg. (Monsanto). When subjected to artificial gastric fluid for one hour and artificial intestinal fluid for seven hours, the following results were obtained:

| | 1 hour, percent | 4 hours, percent | 8 hours, percent |
|---|---|---|---|
| Phenobarbital sodium released | 19 | 80 | 100 |
| Alkaloids released | 22 | 65 | 88 |
| Weight loss | 8 | 42 | 55 |

*Example VI*

Similarly, tablets containing 300 mg. of pentylenetetrazol and 150 mg. of nicotinic acid and having a hardness (Monsanto) of 9.3 kg. were prepared from the following:

| Material | Percent by weight | Solubility factor | Total |
|---|---|---|---|
| Medicaments: | | | |
| Pentylenetetrazol | 40.3 × | 1 | 40.3 |
| Nicotinic acid | 20.1 × | 2 | 40.2 |
| Filler: | | | |
| Calcium phosphate, dibasic | 12.5 × | 4 | 50.0 |
| Fatty material: Hydrogenated cottonseed oil | 10 × | 5 | 50.0 |
| Binders: | | | |
| Zein | 3.8 × | 5 | 19.0 |
| Acacia | 2.2 × | 1 | 2.2 |
| Lubricants: | | | |
| Talc | 10 × | 5 | 50.0 |
| Magnesium stearate | 1.1 × | 5 | 5.5 |
| Time delay number | | | 257.2 |

The total tablet weight was 11.5 grams and the hardness was 9.3 kg. (Monsanto). The following results were obtained from exposure to artificial gastric juice for one hour followed by artificial intestinal fluid for seven hours:

| | 1 hour, percent | 4 hours, percent | 8 hours, percent |
|---|---|---|---|
| Nicotinic acid released | 40 | 75 | 95 |
| Pentylenetetrazol released | 45 | 77 | 91 |
| Loss in weight | 37 | 70 | 87 |

Exposure to water gave substantially similar results.

*Example VII*

The initial release rate of a medicament such as that of Example V can be modified by the use of an acid neutralizing compound as illustrated by the following:

| Material | Percent by weight | Solubility factor | Total |
|---|---|---|---|
| Medicaments: | | | |
| Hyoscyamine sulfate | | | |
| Atropine sulfate | 0.12 × | 1 | 0.12 |
| Hyoscine hydrobromide | | | |
| Pentobarbital sodium | 16.1 × | 1 | 16.1 |
| Filler and neutralizer: | | | |
| Magnesium hydroxide | 24.7 × | 5 | 123.5 |
| Powdered sugar | 15.48 × | 1 | 15.48 |
| Fatty material: Hydrogenated cottonseed oil | 16.1 × | 5 | 80.5 |
| Binders: | | | |
| Zein | 5.2 × | 5 | 26.0 |
| Acacia | 5.2 × | 1 | 5.2 |
| Lubricants: | | | |
| Talc | 13.2 × | 5 | 66.0 |
| Magnesium stearate | 3.9 × | 5 | 19.5 |
| Time delay number | | | 352.4 |

The following release rate was obtained:

| | 1 hour, percent | 4 hours, percent | 8 hours, percent |
|---|---|---|---|
| Phenobarbital sodium released | 28 | 63 | 82 |
| Alkaloids released | 30 | 65 | 74 |
| Weight loss | 11 | 28 | 35 |

It may be noted that the time delay number of this composition is somewhat high thus lowering the overall release rate. This can be adjusted by replacing some of the talc with sugar.

I claim:

1. A sustained release pharmaceutical tablet consisting essentially of about 1 to 70% of a water soluble medicament about 10 to 40% of a substantially water insoluble fatty material, about 5 to 70% of a filler, about 5 to 10% of a binder and about 5 to 20% of a lubricant, the tablet having a time delay number of about 250 to 350, a hardness between about 10 kg. and 3 kg., and being a substantially homogeneous tablet which retains its original shape while the soluble medicament is leached therefrom, thus leaving a network of minute channels in the tablet.

2. The tablet of claim 1 wherein the medicament is d-amphetamine sulfate.

3. The tablet of claim 1 wherein the medicament is pentylenetetrazole and nicotinic acid.

4. The tablet of claim 1 wherein the medicament is hyoscymine sulfate, atropine sulfate, hyoscine hydrobromide and pentobarbital sodium.

5. A sustained release pharmaceutical tablet consisting essentially of about 1 to 70% of a mixture of pentylenetetrazole and nicotinic acid, the weight ratio of the former to the latter being about 2:1, about 10 to 40% of a fatty material in which is present a fatty acid containing about 12 to 22 carbon atoms, about 5 to 70% of a filler, about 5 to 10% of a binder and about 5 to 20% of a lubricant, the tablet having a time delay number of about 250 to 350, a hardness of about 9.3 to 10 kg., and a substantially homogeneous tablet which retains its original shape while the medicaments are leached therefrom, thus leaving a network of minute channels in the tablet.

6. The tablet of claim 5 wherein the filler is selected from the group consisting of calcium phosphate dibasic, magnesium carbonate, talc and magnesium trisilicate.

7. The tablet of claim 5 wherein the binder is a mixture of acacia and zein.

8. The tablet of claim 5 wherein the lubricant is talc and magnesium stearate.

9. The tablet of claim 5 wherein the fatty material is hydrogenated cottonseed oil.

10. A sustained release pharmaceutical tablet consisting essentially of about 1 to 70% of a mixture of pentylene-tetrazole and nicotinic acid, the weight ratio of the former to the latter being about 2:1, about 10 to 40% of a fatty material selected from the group consisting of stearic acid and hydrogenated cottonseed oil, about 5 to 70% of a water insoluble filler, about 5 to 10% of a binder including a water insoluble type, and about 5 to 70% of a lubricant, said tablet having a time delay number of about 250 to 350 and a hardness of about 9.3 to 10 kg., and being substantially homogeneous such that it retains its original shape while the medicaments are being leached therefrom thus leaving a network of minute channels in the tablet.

11. A sustained release pharmaceutical tablet consisting essentially of about 1 to 70% of a water soluble medicament, about 10 to 40% of a substantially water insoluble fatty material selected from the group consisting of fatty acids of about 12 to 22 carbon atoms, fatty alcohols of about 14 to 31 carbon atoms, hydrogenated oils, esters of fatty acids of about 12 to 31 carbon atoms and fatty alcohols of about 12 to 31 carbon atoms and the fatty acid esters of glycerol, about 5 to 10% of a binder selected from the group consisting of acacia, gelatin, zein, tragacanth, shellac, methyl cellulose, ethyl cellulose, guar gum and sodium carboxy methyl cellulose, about 5 to 70% of a filler selected from the group consisting of sucrose, mannitol, calcium phosphate dibasic, magnesium carbonate, talc, magnesium trisilicate, glucose, lactose, starch ethers, starch esters and about 5 to 20% of a lubricant selected from the group consisting of talc and magnesium stearate, the tablet having a time delay number of about 250 to 350, a hardness between about 10 kg. and 3 kg., and being a substantially homogeneous tablet which retains its original shape while the soluble medicament is leached therefrom and leaves a network of minute channels in the tablet.

References Cited in the file of this patent

UNITED STATES PATENTS

| | | |
|---|---|---|
| 2,736,682 | Hermelin | Feb. 28, 1956 |
| 2,793,979 | Svedres | May 28, 1957 |
| 2,887,438 | Cooper | May 19, 1959 |
| 2,895,881 | Hamoda | July 21, 1959 |
| 2,987,445 | Levesque | June 6, 1961 |

FOREIGN PATENTS

| | | |
|---|---|---|
| 217,287 | Australia | Sept. 16, 1958 |

OTHER REFERENCES

Remington's Practice of Pharmacy, Martin and Cook, The Mack Publishing Co., Easton, Pa., 1956, page 337. (Copy in POSL.)